UNITED STATES PATENT OFFICE.

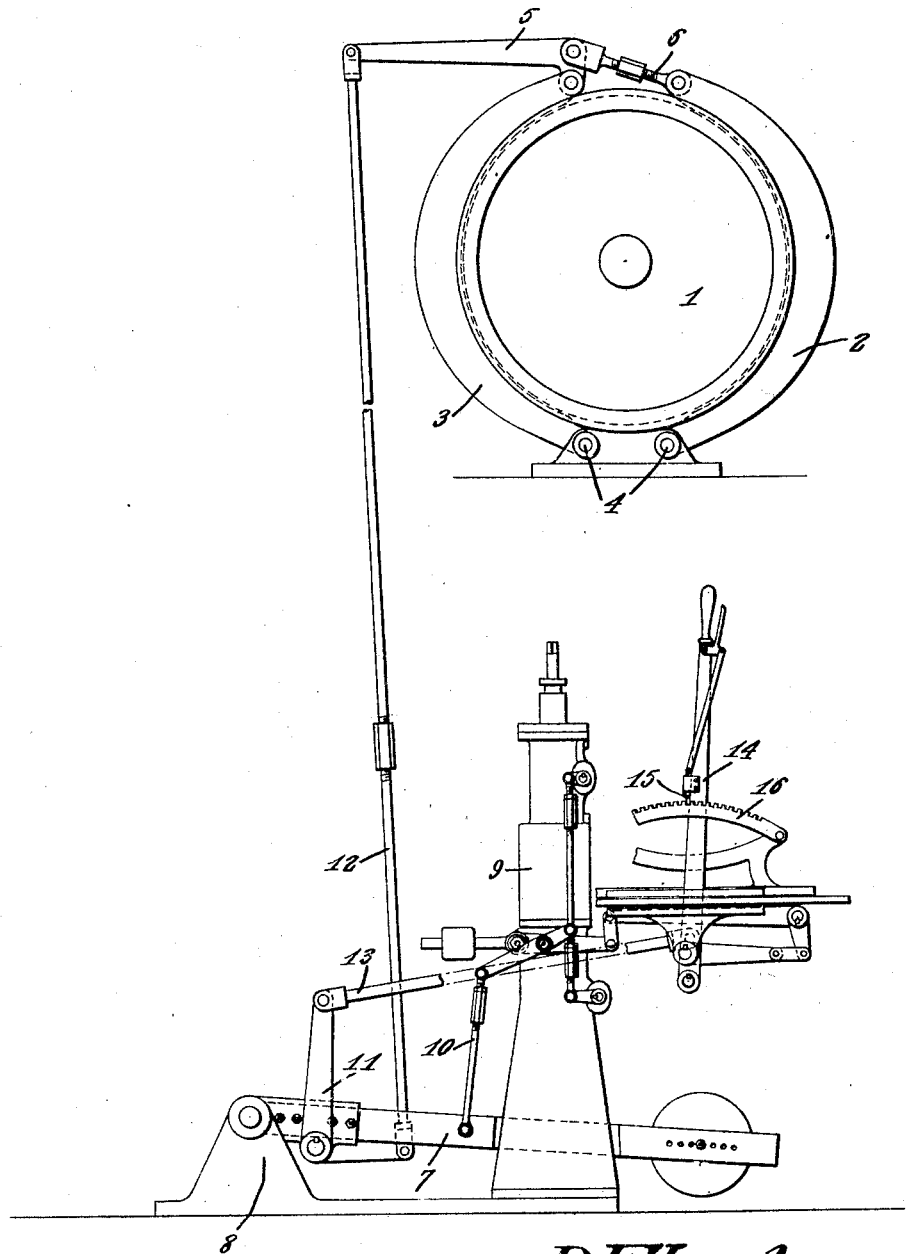

DANIEL F. LEPLEY, OF CONNELLSVILLE, PENNSYLVANIA.

BRAKE CONTROL.

1,358,379.　　　Specification of Letters Patent.　　Patented Nov. 9, 1920.

Application filed December 15, 1919.　Serial No. 344,995.

*To all whom it may concern:*

Be it known that I, DANIEL F. LEPLEY, a citizen of the United States, residing at Connellsville, in the county of Fayette and State of Pennsylvania, have invented a new and useful Brake Control, of which the following is a specification.

This invention relates to a combined hand brake and take-up particularly designed for use in connection with electric hoist and haulage engines although capable of other applications. It is especially desirable for use in connection with mine hoists of that type shown, for example, in Patent 1,183,306 issued to me on May 16th, 1916.

In engines of the character above referred to, it is advantageous to have a positive and secure automatic brake application because of the liability of frequent and unexpected current failures. It is also desirable to have the same brake applying means operative to gradually operate to properly slow down the hoist before it comes to a stop. Various means have been employed by me for applying the brake but it has been found that unless some means is provided for taking up wear the brake will become inefficient after its friction member has become worn and the operating mechanism has reached the limit of its movement.

One of the objects of the present invention is to provide for adjusting the brake parts to compensate for wear thereon, such adjustment being effected easily and quickly without causing delay in the hoisting operation.

A further object is to provide a hand lever which can be utilized either for taking up wear on the brake parts or for applying the brake to stop the operation or retard the operation of the mechanism. It has usually been the practice, heretofore, to employ separate hand levers to operate the brake but before these hand levers could be used it has been necessary to disconnect the automatic brake applying mechanism and couple the hand lever to the brake at the proper point. Such an arrangement has obviously been undesirable because the adjustment and replacement of the parts has necessarily resulted in loss of valuable time.

One of the objects of the present invention is to combine in one structure a brake tightening means and a hand operated brake applying means, said structure being properly connected up at all times with the mechanism of the hoist or other machine and in no way interfering with the proper operation of the automatic brake applying mechanism.

A still further object is to provide a brake applying lever which when moved in one direction will loosen the brake and, when moved in the opposite direction will tighten the brake, said lever being ready at all times for instant use independently of the other brake operating mechanism.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawing, which is a side elevation of the apparatus applied to a brake drum of a hoisting apparatus, the preferred form of the invention has been shown.

Referring to the drawing by characters of reference, 1 designates the brake drum of a hoisting mechanism or the like provided with opposed friction elements or shoes 2 and 3 pivotally mounted at one end, as shown at 4. The short arm of a bell crank lever 5 is connected to the other end of the shoe 3 and the angle portion of said lever is connected to the shoe 2 by an adjustable link 6.

A weighted lever 7 is located in proper relation to the lever 5 and is pivotally mounted on a support 8. This lever is adapted to be supported in an elevated position by a vertical air engine 9 so that, when air is exhausted from the engine in any manner, the brake will gravitate. The means for operating the air engine to release the weighted lever 7 constitutes in itself no part of the present invention as it is to be understood that any desired mechanism may be employed for releasing said lever. It need only be stated however that it has been the practice, heretofore, to provide a rod forming a direct connection between the lever 7 and the bell crank lever 5 so that when the weighted lever 7 is released and moves downwardly, it will pull on lever 5 and cause the shoes 2 and 3 to bind on the drum 1. The movement of lever 7 is limited and after the shoes have become worn to a certain extent the dropping of the lever 7 under old conditions would not result in the application of the shoes to the drum. Consequently disastrous consequences have been possible. The present invention consists in mounting on the lever 7 a bell crank 11 and the lower arm of the bell crank is connected by a rod 12 to the bell crank lever 5. The upper arm of the bell crank 11 is connected by a rod 13 to a hand lever 14 conveniently located and which is provided with a dog 15 adapted to engage a notched segment 16. The lever 14 is normally in a vertical or intermediate position and locked to the segment 16. Thus the rod 13 and bell crank 11 are anchored and, when the weighted lever 7 is moved downwardly, the bell crank 11 will transmit motion therefrom to the rod 12 and thence to the lever 5 to apply the shoes. As the shoes become worn the lever 14 can be shifted one notch or more to shift the lower arm of the bell crank 11 downwardly from the lever 7 and thus shorten the distance between the two levers 5 and 7. If, at any time, it is desired to use the hand lever 14 for applying the brake independently of the automatic brake applying mechanism, it becomes merely necessary to shift lever 14 so as to swing the bell crank 11 to pull through rod 12 onto the lever 5.

What is claimed is:—

1. The combination with a revoluble brake element, opposed brake shoes coöperating therewith, and a lever movable in one direction to apply the shoes to said element, of automatic brake applying mechanism including a weighted lever, a bell crank upon the weighted lever, a connection between one arm of the bell crank and the shoe applying lever, a means for shifting the bell crank to vary the distance between the two levers, and means for anchoring the bell crank.

2. The combination with a revoluble brake element, opposed brake shoes coöperating therewith, and a lever movable in one direction to apply the shoes to said element, of a weighted lever, a bell crank thereon and movable therewith, a connection between one arm of the bell crank and the shoe applying lever, a hand lever, a connection between the hand lever and the other arm of the bell crank for shifting the bell crank angularly relative to the weighted lever, means for holding the hand lever to anchor the bell crank in adjusted position, and means for automatically actuating the weighted lever.

3. The combination with a brake applying lever a weighted lever, means for automatically actuating the weighted lever, and a connection between the levers, of means under the control of the operator for shortening the distance between the levers for taking up wear on the brake and for applying the brake independently of the automatic actuating means.

In testimony that I claim the foregoing as my own, I have hereto affixed my signature in the presence of two witnesses.

DANIEL F. LEPLEY.

Witnesses:
W. H. SOISSON,
BARNETT C. BURKHARDT.